US012746550B2

(12) United States Patent
Chan et al.

(10) Patent No.: US 12,746,550 B2
(45) Date of Patent: Sep. 29, 2026

(54) CHEMICAL DELIVERY SYSTEM, DEVICE AND METHOD THEREOF

(71) Applicant: Shen Zhen Biorocks Biotechnology Company Limited, Shenzhen (CN)

(72) Inventors: Ho Nam Chan, Hong Kong (CN); Yiwei Shu, Hong Kong (CN)

(73) Assignee: Shen Zhen Biorocks Biotechnology Company Limited, Shenzhen (CN)

( * ) Notice: Subject to any disclaimer, the term of this patent is extended or adjusted under 35 U.S.C. 154(b) by 1068 days.

(21) Appl. No.: 17/782,108

(22) PCT Filed: Nov. 29, 2020

(86) PCT No.: PCT/CN2020/132553
§ 371 (c)(1),
(2) Date: Jun. 2, 2022

(87) PCT Pub. No.: WO2021/109948
PCT Pub. Date: Jun. 10, 2021

(65) Prior Publication Data

US 2023/0011300 A1 Jan. 12, 2023

(30) Foreign Application Priority Data

Dec. 2, 2019 (CN) ........................ 201911211091.2
Dec. 2, 2019 (CN) ........................ 201911211155.9
Dec. 2, 2019 (CN) ........................ 201922117442.5

(51) Int. Cl.
*B01L 3/00* (2006.01)
*A01N 1/128* (2025.01)
*B01L 1/00* (2006.01)

(52) U.S. Cl.
CPC .............. *B01L 3/527* (2013.01); *A01N 1/128* (2025.01); *B01L 1/00* (2013.01); *B01L 2200/16* (2013.01);

(Continued)

(58) Field of Classification Search
CPC .......... B01L 3/5085; B01L 2300/1855; C12M 23/12; C12M 23/24; C12M 23/38; C12M 3/00; C12M 1/32
See application file for complete search history.

(56) References Cited

U.S. PATENT DOCUMENTS

2009/0130756 A1 5/2009 Klann et al.
2009/0305397 A1* 12/2009 Dodgson ............... C12M 23/24
435/307.1

(Continued)

FOREIGN PATENT DOCUMENTS

CN 106942201 7/2017
CN 207519503 6/2018

(Continued)

OTHER PUBLICATIONS

Zhang, Cong, Ding An, Qiong Xiao, Fu-Quan Chen, Yong-Hui Zhang, Hui-Fen Weng, and An-Feng Xiao. 2021. "Convenient Agarose Preparation with Hydrogen Peroxide and Desulfation Process Analysis" Marine Drugs 19, No. 6: 297. https://doi.org/10.3390/md19060297.*

*Primary Examiner* — David C Mellon
(74) *Attorney, Agent, or Firm* — Pacer K. Udall; Booth Udall, PLC

(57) ABSTRACT

Chemical delivery systems, device and methods are provided. A chemical delivery system may include a vessel and a chip. The vessel may include a groove configured to hold a solution. The groove includes an open surface, the open surface having a first surface area. The solution includes a target material. The chip includes a first side, a second side opposing the first side, and a bottom side. The chip includes one or more chambers configured to hold one or more chemicals, the one or more chambers including a bottom surface having a second surface area. The second surface area is greater than the first surface area. When one of the (Continued)

one or more chambers is positioned over the groove, the respective chemical in the chamber moves into the solution in the groove. The system increases the ease, stability, and reliability of a chemical delivery process.

15 Claims, 8 Drawing Sheets

(52) U.S. Cl.
CPC .................. *B01L 2300/0829* (2013.01); *B01L 2300/1894* (2013.01)

(56) References Cited

U.S. PATENT DOCUMENTS

| | | | |
|---|---|---|---|
| 2015/0231635 | A1 | 8/2015 | Okano et al. |
| 2018/0368394 | A1 | 12/2018 | Kjelland et al. |

FOREIGN PATENT DOCUMENTS

| | | | |
|---|---|---|---|
| CN | 207653420 | 7/2018 | |
| WO | 2006000425 | 1/2006 | |
| WO | WO-2018005802 A1 * | 1/2018 | ............. A01N 1/162 |

* cited by examiner

Prepare equilibrium solution (ES) and vitrification solution (VS) into the form of hydrogels, respectively — Step S11

↓

Load the embryo into the groove with basic solution on the vessel — Step S12

↓

Place the equilibrium solution (ES) hydrogels and vitrification solution (VS) hydrogels, which are prepared at step S11, respectively on the vessel, and sequentially contact with the groove containing embryo and the basic solution (BS), to achieve the sequential delivery of equilibrium solution (ES) and vitrification solution (VS) to the embryo — Step S13

Fig. 10

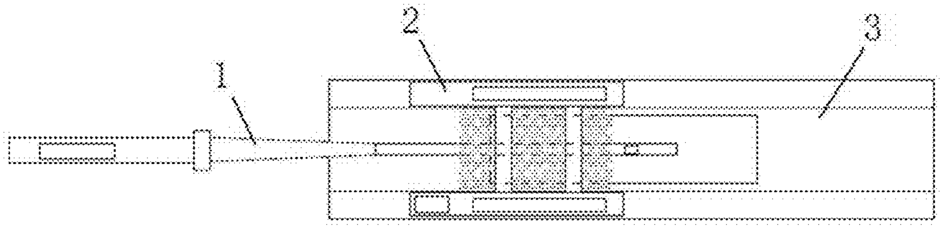

Fig. 11

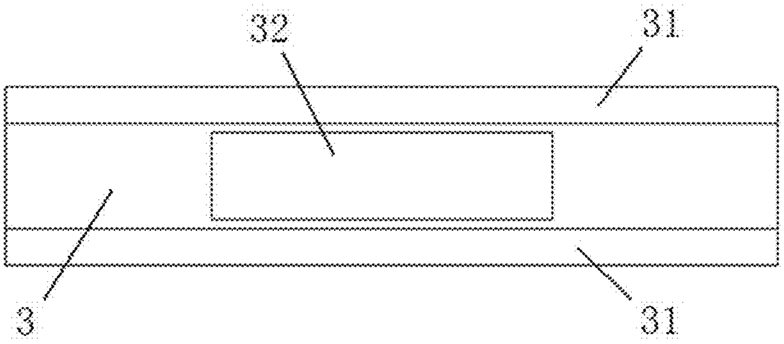

Fig. 12

CHEMICAL DELIVERY SYSTEM, DEVICE AND METHOD THEREOF

TECHNICAL FIELD

This invention relates generally to chemical delivery. More particularly, this invention relates to systems and methods for delivering chemicals to, for example, biological materials and solutions.

BACKGROUND

The precise delivery of chemicals to biomaterials or basic solutions for specific functions or reactions is of paramount importance in numerous applications and research fields. For example, in the oocyte/embryo cryopreservation process, basic solution (BS), equilibrium solution (ES), and vitrification solution (VS) need to be delivered to the retrieved oocyte/embryo sequentially before putting the oocyte/embryo into liquid nitrogen for cryopreservation.

To ensure a good cryopreservation result, it is necessary to precisely control the contact time of oocyte/embryo with different chemicals according to their concentration. For example, due to the high toxicity of the VS, the contact time of oocyte/embryo with the VS should be restricted within 60 seconds. One conventional manual method of manipulating the oocyte/embryo into contact with different solutions is using a micropipette to take up the oocyte/embryo in solution and deliver it to the next container with another solution. Transferring the oocyte/embryo from the ES to the VS with a micropipette requires the operator to stay absolutely focused under the microscope to manipulate the oocyte/embryo precisely within the limited time. Also, the operator needs to minimize the amount of solution remaining with the oocyte/embryo on the cryopreservation vessel. Afterwards, the cryopreservation vessel needs to be put into the liquid nitrogen in time for the subsequent cryopreservation.

However, the size of oocyte/embryo is around 0.1 to 0.2 mm, which usually cannot be seen with the naked eye. It requires the use of a light microscope to help the operator to take up the oocyte/embryo in solution and deliver it to the next container with another solution. So, this process inevitably carries the former solution into the latter solution during the delivery process, which may affect the concentration and components of the latter solution. Therefore, the operators are required to precisely control not only the timing for oocyte/embryo manipulation, but also the amount of solution, to avoid aspirating too much solution into the micropipette, when observing the location of oocyte/embryo with microscope in real time. It means that, for the conventional method, the operators need to be highly skillful and the results are not robust enough.

Genea Limited (Australia) provides an automatic oocyte/embryo vitrification instrument, Gavi®, to replace the operators and to automate chemicals delivery during oocyte/embryo vitrification to reduce the difficulties and instabilities of manual operation. When conducting the oocyte/embryo vitrification by the instrument Gavi®, operators need to first place the oocyte/embryo into the corresponding carrier. Then, according to the pre-setting program and operation, Gavi® achieves its automation by the robotic arm that sequentially delivers and removes the different chemicals at precise time intervals into the basic solution containing oocyte/embryo. During the automatic process, however, due to the higher density of the vitrification solution than water, the oocyte/embryo in the vitrification solution is usually suspended and easily moves together with the solution. This process relies on the weight of oocyte/embryo to sink into the bottom of the carrier due to gravity, which raises the risk of oocyte/embryo loss during the delivery and removal of chemicals by the robotic arm. The system addresses this problem by removing a reduced amount of solution, keeping more solution in the vessel to lower the risk of accidental oocyte/embryo loss. However, the excessive solution remaining in the vessel slows down the cryopreservation process due to the increased heat capacity, which is detrimental to the cryopreservation process and could even lead to the failure of cryopreservation.

In addition, the Gavi® is a huge machine and occupies a lot of area in the workplace due to the complex robotic arm structure. It increases construction and maintenance cost for laboratories, limiting its promotion and application, as well as making it difficult to reduce the oocyte/embryo cryopreservation cost. A need exists for a smaller device that provides improved delivery and control of the chemicals.

SUMMARY

In an embodiment, a chemical delivery system includes a vessel and a chip. The vessel may include a groove configured to hold a solution. The groove includes an open surface, the open surface having a first surface area. The solution includes a target material. The chip includes a first side, a second side opposing the first side, and a bottom side. The chip includes one or more chambers configured to hold one or more chemicals, the one or more chambers including a bottom surface having a second surface area. The second surface area being greater than the first surface area. The vessel and the chip are movable relative to each other and, when one of the one or more chambers is positioned over the groove, the respective chemical in the chamber moves into the solution in the groove. The system increases the ease, stability, and reliability of a chemical delivery process.

In an embodiment, a method of using a chemical delivery system includes fixing a vessel with the recessed groove facing upward, the vessel containing the solution and the target material, wherein the solution extends above an upper surface of the vessel, and positioning the chip on the vessel, wherein at least one of the one or more chambers contacts the upper surface of the vessel. The method further includes moving the chip or the vessel to align one of the one or more chambers of the chip with the recessed groove of the vessel, wherein the respective chemical in the chamber transfers into the solution in the recessed groove.

In an embodiment, a chemical delivery device or a chip includes a plate-like frame structure, at least two support plates being generally parallel to each other; and at least one partition plate extending between two adjacent support plates, the at least one partition plate defining several independent chambers, wherein the chambers are configured to contain at least one chemical.

In an embodiment, the chemicals to be delivered are prepared into the form of hydrogels. Diffusion of solutions between the immobile hydrogels and the embryos allows for delivery of chemicals to the embryos. Therefore, it reduces the risk of embryo loss because of excessive liquid flow or accidental removal of the embryo from the vessel during liquid aspiration, improving the protection of the embryo in the chemical delivery process and improving the reliability and stability of the whole process. It also avoids free floating of the embryos with the solution during direct solution delivery, ensuring the fast and precise control of embryos during the chemical delivery process, improving the convenience and efficiency of operation.

In an embodiment, the solutions are prepared into the form of hydrogels and the embryos are in normal condition. Whether the embryos are pre-loaded into a groove and the hydrogels are moved or the embryos are transferred into fixed hydrogels to deliver the chemicals to the embryos, the embryos are in normal condition throughout the whole process of chemical delivery, directly carrying out the following cryopreservation process. Therefore, it could minimize the unnecessary handling of embryos before cryopreservation to avoid the damage and impact on embryos caused by the unnecessary handling, thus improving the protection of the embryo. In addition, the embryos could be directly thawed and recovered under the conventional thawing protocol, without any additional embryo retrieval procedures, to minimize the handling of embryo retrieval during thawing and recovery, improving the protection of embryos, and improving the quality and result of the entire embryo cryopreservation process.

In an embodiment, support plates are used to support and fix the hydrogels. The support plates could be directly controlled and handled to precisely fix and move the hydrogels. As a result, not only can the hydrogels be manipulated more precisely, ensuring the precise chemical delivery to the embryos, but also direct contact with the hydrogels is reduced, to avoid contamination and damage to hydrogels, improving the protection of hydrogels.

BRIEF DESCRIPTION OF THE DRAWINGS

The present disclosure will be more readily understood from a detailed description of some example embodiments taken in conjunction with the following figures:

FIG. 10 is a flow chart of sequential delivery of an equilibrium solution and vitrification solution to an oocyte/embryo in a basic solution according to one embodiment.

FIG. 11 is a schematic diagram of the structure of the chemical delivery system according to one embodiment.

FIG. 12 is a schematic diagram of the structure of the substrate of the chemical delivery system of FIG. 2.

DETAILED DESCRIPTION

Figure 1:
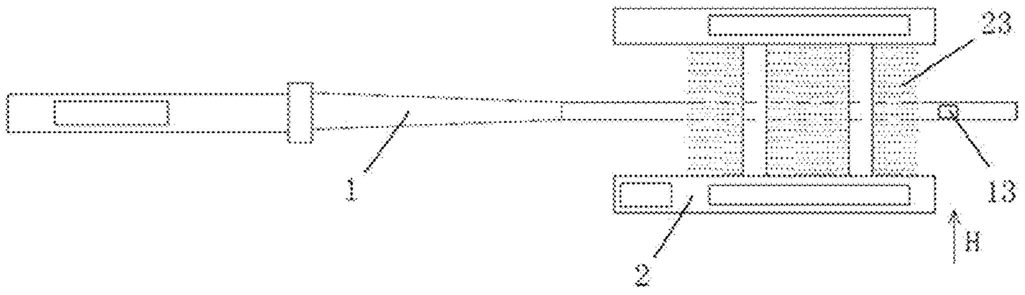
FIG. 1 is a schematic diagram of the structure of a chemical delivery system according to one embodiment.

Various non-limiting embodiments of the present disclosure will now be described to provide an overall understanding of the principles of the structure, function, and use of the apparatuses, systems, methods, and processes disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments.

The following example embodiments describe the application of the present technical invention with reference to the figures, and take the chemical delivery of different chemicals in the embryo vitrification process as an example. Embodiments may also be used in applications other than embryo vitrification.

To solve the operational difficulty in chemical delivery and the poor stability in the existing oocyte/embryo cryopreservation method, embodiments described herein include a chemical delivery system. The system can not only solve the problems mentioned above existing in the oocyte/embryo cryopreservation process, but also could be applied to chemical delivery to other biomaterials and basic solutions. Additionally, embodiments described herein include a method of delivering chemicals to biomaterials. Further embodiments described herein include a method of preparing hydrogels for chemical delivery to biomaterials. Embodiments described herein also include a cryopreservation process including preserving a biomaterial using a hydrogel comprising a cryoprotectant.

In an example embodiment, the system can include a vessel and a chip. The vessel contains a groove for holding solution. The chip contains chambers that store the chemicals to be delivered. The area of the chambers is greater than the opening area of the groove. In an embodiment, the angle between the bottom and the wall of the groove can be less than or equal to 90°. The vessel can move along the chip relatively. The chemical to be delivered in the chamber can cover the solution in the groove completely, and the chemical and the solution can achieve diffusion between each other. In an embodiment, the chemical to be delivered can be in the form of gel if it is a solution and is fixed or embedded in the chamber of the chip.

In an embodiment, the bottom of the chamber can be a permeable membrane, allowing the chamber to form a container. The permeable membrane provides support to the chemical to be delivered. The permeable membrane may comprise a perforated membrane, a mesh, or a dialysis membrane. The permeable film may be a water-soluble film.

In an embodiment, the chip can be a plate-like frame structure and provides several sequentially aligned chambers for the fixation of the chemicals to be delivered. The chambers located at the two ends of the chip may have open sides (e.g., an open front end and back end).

In an embodiment, the chip can include at least two support plates and at least one partition plate; the support plates are arranged parallel to each other. The partition plates are located between two adjacent support plates, forming several mutually independent chambers. Flexible connections may be made between the support plates and the partition plates and the dimension of the chambers formed can be adjusted freely. The opposite faces of the two adjacent support plates may each be provided with a sliding groove. The ends of the partition plates may be located in the sliding groove and can be slid freely.

In an embodiment, the system can contain a substrate. The substrate is used to hold the vessel and is designed with two parallel paths in the substrate. The paths support and hold the chip, keeping the lower surface of the chip in contact with the upper surface of the vessel. The connection between the paths and chip may be detachable. The paths and chip may be connected by a magnet. The paths may be made of ferromagnetic material whereas the chip may include a magnet.

In an embodiment, there can be a light-transparent region in the substrate. The light-transparent region corresponds to the location of the groove. The light-transparent region may have a hollow structure. The light-transparent region may have a light-transparent heating plate structure.

In an embodiment, the base can be designed to define a hollow. The hollow in the base is light-transparent and it corresponds to the location of the groove.

In an embodiment, the system can contain a base. The base contains a drive unit. The vessel and the base are fixed correspondingly. The drive unit connects with the chip to drive the chip for horizontal movement relative to the vessel. Additionally or alternatively, the chip and the base are fixed correspondingly. The drive unit connects with the vessel to drive the vessel for horizontal movement relative to the chip.

In an embodiment, a method using the chemical delivery system can include the following procedures: S1) Fix the vessel that holds the solution: fix the vessel horizontally with the groove facing upward. The angle between the bottom of the groove and the wall of the groove is less than or equal to 90°; S2) Set the chip containing the chemical to be delivered: place the chip containing the chemical of interest above the vessel, allowing the contact between the chemical and the upper surface of the vessel. There is an interval between the chip and the groove to avoid the coverage of the groove by the chip; S3) Transfer the solution to the groove of the vessel with the liquid level of the solution being higher than the groove; and S4) Move the chip along the vessel. It enables the direct contact between the chemicals to be delivered and the solution in the vessel, allowing diffusion between the chemical and the solution.

In an embodiment, there can be several chambers in the chip to allow a sequential delivery of different chemicals to be delivered. By adjusting the dimension of the chambers and the moving speed of the chip, the contact time between the chemicals to be delivered and the solution in the groove can be controlled.

An example application of using an embodiment of the chemical delivery system in the embryo cryopreservation process is provided. The oocyte/embryo and basic solution are pre-loaded into the groove of the vessel. The chemicals to be delivered are sequentially fixed in the chambers of the chip, and the coverage area of the chemicals to be delivered is larger than the opening area of the groove. Through the movement of the chip along the vessel, the chemicals of interest can sequentially contact the solution in the groove. Diffusion between the chemical solutions in the gels and the solution in the groove is allowed. In this way, the chemical delivery into or out of the solution in the groove is achieved. When the chemical to be delivered covers the groove completely, the chemical exchange is done by diffusion, which reduces the risk of embryo loss because of excessive liquid flow or accidental removal of the embryo from the vessel during liquid aspiration. Utilizing embodiments of the chemical delivery system for an example application of the embryo cryopreservation process may have the benefit of improving the protection of the embryo in the chemical delivery process, improving the reliability and stability of the whole process.

In an embodiment, the chemical solution to be delivered can be in the form of gel to easily connect and fix with the chip, improving the convenience of operation. The gel allows effective diffusion of chemicals into or out of the solution in the groove when they are in contact, ensuring the effective delivery and removal of chemicals.

In an embodiment, by adjusting the dimension of the groove, the volume of the final solution remaining in the groove can be controlled precisely. It ensures better quality and result for the further embryo cryopreservation.

In an embodiment, the lower surface of chemical to be delivered (e.g., a gel containing the chemical) can be flush with the bottom of the chamber.

In an embodiment, the lower surface of chemical to be delivered (e.g., a gel containing the chemical) can extend outside of the bottom of the chamber In an embodiment, the inner surface of the chamber can be provided with a fixing groove for auxiliary support of the gel.

In an embodiment, the bottom of the chamber can be provided with a permeable substrate that forms the container structure; the permeable substrate provides support for the chemicals to be delivered. The permeable substrate may comprise a membrane (e.g., a dialysis membrane), a mesh, or a film. The permeable film may be a water-soluble film.

In an embodiment, a flexible connection can be adopted between the support plates and the partition plates, and the dimension of the chambers can be freely adjusted.

In an embodiment, the opposite sides of the two adjacent support plates can each be provided with a sliding groove. The ends of the partition plates are located in the sliding groove and can be slid freely.

In an embodiment, the two sides of the chambers of the chip can adapt opening structures. The front and back sides of the chip may be open.

In an embodiment, a method for sequentially delivering chemicals can include the following procedures: Step ST1, prepare the chemicals to be delivered into the form of hydrogels; Step ST2, contact the hydrogels prepared at Step ST1 with biomaterials to diffuse the solutions of hydrogels into the biomaterials to achieve chemical delivery.

In an embodiment, at Step ST1, hydrogels are fixed into a plate-like frame structures including support plates that provide chambers for the fixation of hydrogels.

In an embodiment, at Step ST1, when fixing the hydrogels into the support plates, the bottom surface of hydrogels is flush with or extended out of the opening of the chambers.

In an embodiment, the support plates provide several chambers for simultaneous fixation of several hydrogels at Step ST1.

In an embodiment, the chemicals to be delivered are prepared into any kinds of physical hydrogels or chemical hydrogels at Step ST1.

In an embodiment, at Step ST2, the biomaterials are pre-loaded into the groove of the vessel, and the groove is filled with solutions.

In an embodiment, the opening area of the chambers is larger than the groove in the vessel.

In an embodiment, at Step ST2, biomaterials are pre-loaded and then the hydrogels prepared at Step ST1 are moved to contact the biomaterials.

In an embodiment, at Step ST2, the support plates move vertically along the surface of the vessel, and the hydrogels would vertically and directly contact the basic solution in the groove.

In an embodiment, at Step ST2, the support plates move horizontally along the surface of the vessel, and the hydrogels would horizontally and gradually contact the basic solution in the groove.

In an embodiment, the support plates move relative to the surface of the vessel, where the chambers have open sides (e.g., an open front end and back end).

In an embodiment, the several aligned chambers are provided on the support plates, and sequentially move across the groove on the vessel at Step ST2.

In an embodiment, the dimension of the chambers are uniform and by adjusting the moving speed of the support plates relative to the vessel at Step ST2, the contact time between the hydrogel in each chamber and the basic solution in the groove can be controlled.

In an embodiment, the dimension of the chambers are not uniform and by adjusting the dimension of each chamber, the support plates could move horizontally along the vessel at a uniform speed at Step ST2, and the contact time between the hydrogel in each chamber and the basic solution in the groove can be controlled.

In an embodiment, at Step ST2, the hydrogels prepared at Step ST1 are fixed, and biomaterials are transferred into the hydrogels prepared at Step ST1, to achieve the contact between the biomaterials and the hydrogels prepared at Step ST1.

In an embodiment, the chemicals to be delivered are prepared into the form of hydrogels at Step ST1 with plate-like structure and with receptacles for loading biomaterials.

In an embodiment, the chemicals to be delivered are prepared into the form of hydrogels at Step ST1 with independent groove-like structure and the hydrogels are fixed and embedded based on needs.

In an embodiment, a method for preparing a vitrification solution hydrogel at Step ST1, comprises: Step T1, add the permeable cryoprotectants into basic culture medium, to obtain double concentration permeable cryoprotectants solution; Step T2, add the non-permeable cryoprotectants into basic culture medium, to obtain double concentration non-permeable cryoprotectants solution; Step T3, dissolve agarose into the double concentration non-permeable cryoprotectants solution at 80° C.-90° C., to obtain 0.1-6% agarose solution; Step T4, 1:1 add the double concentration permeable cryoprotectants solution into the 80° C.-90° C. agarose solution. The mixture is stirred and allowed to cool down and solidify into the vitrification solution agarose gel.

This chemical delivery method completely avoids the risk of embryo loss because of excessive liquid flow or accidental removal of the embryo from the vessel during liquid aspiration, improving the reliability and stability of the whole process, ensuring the following cryopreservation process to be carried out normally.

This chemical delivery system is not only simple and cost-effective, but also occupies little space. Simultaneous processing of several groups of biomaterials can be achieved to obtain higher processing efficiency and lower cost.

With reference to FIGS. 1-7, in an embodiment, a chemical delivery system includes a vessel 1 and a chemical delivery device, such as a chip 2. The vessel 1 is configured to hold the target biological material 5 and/or solution 6 to be processed. The target material may be, for example, an embryo 5. The chip 2 contains one or more chemicals to be delivered, which may be delivered sequentially. Either one or both of the vessel 1 and the chip 2 may be configured to move relative to each other. When relative movement is described below, although the movement may be described in connection with one of the vessel 1 and the chip 2, one skilled in the art will understand that the movement may be by either or both of the vessel 1 and the chip 2.

Figure 2:
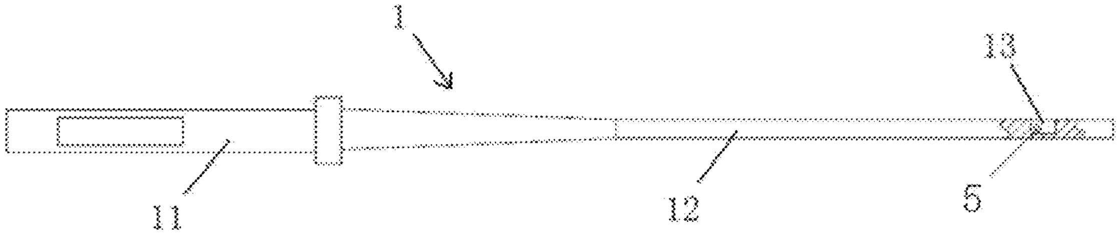
FIG. 2 is a schematic diagram of the structure of the vessel of the chemical delivery system of FIG. 1.

As shown in FIG. 2, in an embodiment, the vessel 1 includes a handle 11, a thin film 12, and a groove 13 or recess. The groove 13, which is configured to contain the embryo 5 to be processed and the relevant solution 6, is located near the front or distal end of the thin film 12, while the handle 11 is at the rear or proximal end of the thin film 12. The dimensions of the groove 13 can be adjusted according to the number and size of embryos 5 to be processed and the amount of solution 6 used. In an embodiment, the dimensions of the groove 13 are designed in accordance with the desired amount of solution 6 remaining in the groove 13 for the following vitrification procedures, to precisely control the final amount of the remaining solution 6. Although only one groove 13 is shown in FIGS. 1 and 2, in some embodiments, a vessel 1 may include multiple grooves 13 depending on the number of embryos 5 to be processed. Multiple embryos 5 or other biomaterials can be simultaneously processed on the same vessel 1 to enhance the efficiency.

In an embodiment, the vessel 1 has a strip-like structure to fit into existing equipment and systems for the embryo cryopreservation process, thereby improving the compatibility of the vessel 1. In some embodiments, the vessel 1 may have other structures with grooves, such as a flat structure, depending on the applications and requirements of operations. The handle 11 of the vessel 1 may have a structure with sufficient width to facilitate labeling of the relevant information for the material to be processed. The thin film 12 may be uniform in thickness, transparent, biocompatible, and made of a plastic with a sufficiently high heat transfer, to ensure its applicability to place embryo and its heat transfer speed for following vitrification. In some embodiments, the vessel 1 may have other structures with grooves, such as a flat structure, depending on the applications and requirements of operations.

Figure 3:
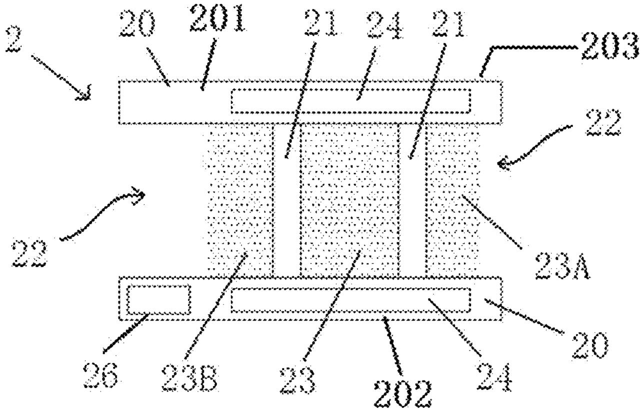
FIG. 3 is a schematic diagram of the structure of the chip of the chemical delivery system of FIG. 1.

Referring now to FIG. 3, in an embodiment, the chip 2 with a first side 201 and a second side 202 opposing the first side 201, and a bottom side 203, has a plate-like frame structure and provides more than one sequentially aligned, independent chambers 22, for loading the chemicals to be delivered. In the present embodiment, the frame structure of the chip 2 includes two support plates 20 and two partition plates 21. The number of support plates 20 and partition plates 21 may vary, for example, based on the number of desired chambers 22. For example, a grid of nine square independent chambers 22 can be formed by adjusting the number of support plates 20 and partition plates 21, allowing a simultaneous delivery of nine different chemicals or solutions. The size and shape of the chambers 22 may vary. In an embodiment, the chambers 22 are rectangular chambers of the same dimensions. In another embodiment, the shapes and the dimensions of the chambers could be adjusted based on the amount of desired contact time between the solution 6 in the groove 13 and each hydrogel 23 in the respective chamber 22. For example, the chambers 22 may have different dimensions for the movement along the surface of vessel 1 (e.g., the dimension parallel to the axis of movement).

In an embodiment, the support plates 20 are arranged generally parallel to each other, and the partition plates 21 are also arranged generally parallel to each other. The two parallel partition plates 21 are located between and generally perpendicular to the two parallel support plates 20. The partition plates 21 divide the area between the two support plates 20 into three mutually independent chambers 22 for containing different chemicals or materials. In an embodiment, based on the amount, type, and concentration requirements of the chemicals to be delivered, the number of chambers 22 could be adjusted flexibly to precisely control the concentration gradient between the adjacent chemicals, ensuring the precision of chemicals delivery.

In the example application of embryo vitrification, in certain embodiments, the solution 6, which may be the basic solution, together with the embryo 5 are firstly directly placed in the groove 13. Basic solution, equilibrium solution, and vitrification solution are sequentially fixed in the three chambers 22 in the chip 2. Each of the solutions may contain a cryoprotectant. The concentration of the cryoprotectant in the basic solution in the chip is the lowest while that in the vitrification solution is the highest. These solutions are disposed on the chip 2 in the form of gels 23 (e.g., hydrogels) in the respective chambers 22. After firstly placing basic solution directly into the groove 13, the three independent chambers 22 in the chip 2 are used to fix different concentration of cryoprotectants respectively. The sequence of the gels 23 and the related components and respective concentration therein may be precisely controlled to deliver to the embryo 5, ensuring the precision of solution delivery.

In an embodiment, the bottom surface of a gel 23 is flush with the bottom of the frame structure (e.g., the bottom of the support plates 20 and partition plates 21). In this way, when the chip 2 is moved horizontally along the vessel 1 to sequentially deliver the different chemicals in the chambers 22 to the solution 6 in the groove 13, the even surface of the frame structure and gels 23 can ensure a smooth motion of the chip 2 and the protection of the gels 23, with the help of the effective support by the frame structure towards the movement of the gels 23. It can also ensure that each of the gels 23 in the different chambers 22 effectively contacts the solution 6 in the groove 13, further ensuring the effective delivery of chemicals. Similarly, in other embodiments, the lower surface of the gels 23 may be extended beyond the bottom surface of the chamber 22 if the chip 2 is only used to deliver chemicals in a single gel 23 without horizontal movement to ensure an effective contact of the gel 23 and the solution in the groove 13.

In an embodiment, flexible connections can be made between the support plates 20 and the partition plates 21 in the chip 2, so the dimension of the chambers 22 can be adjusted freely to better satisfy requirements for different amount of chemical delivery. In other words, the support plates 20 and the partition plates 21 may be movably coupled. For example, the sides of the two adjacent support plates 20 facing each other may be each provided with a sliding groove. The ends of the partition plates 21 can be put into the sliding groove and moved through the groove, so the dimension of the chambers 22 can be adjusted freely.

Figure 4:
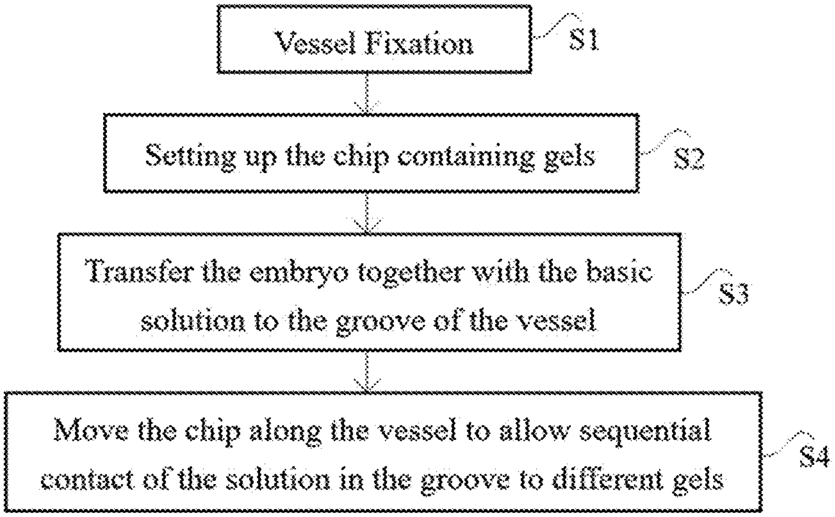
FIG. 4 is a flow chart of chemical delivery in embryo vitrification procedures using the chemical delivery system of FIG. 1.

Referring to FIG. 4, a method of using a chemical delivery system (e.g., the system of FIGS. 1-3) according to an embodiment to process different solutions in, for example, the embryo vitrification process is provided. The order of these steps may vary. First, the vessel 1 that holds the embryo 5 to be processed and the solution 6 is fixed or positioned. The vessel 1 may be positioned horizontally with the groove 13 facing upward (S1).

In S2, to set up the chip 2, the basic solution, equilibrium solution, and vitrification solution are prepared into the form of gels 23. An example method of preparation is described below. The gels 23 then are sequentially fixed or embedded into the three corresponding chambers 22 in the chip 2. The gels 23 can be generated by conventional physical gel production methods such as the use of sodium alginate gel, gelatin gel, or agarose gel. Additionally, chemical gel production methods could also be adopted, such as the use of PEGDA gel or GelMA gel. Then, the chip 2 containing the gels 23 is positioned above the vessel 1, allowing contact between the gels 23 and the upper surface of the vessel 1. The chip 2 may initially be positioned to have no contact with the groove 13; this interval between the chip 2 and the groove 13 avoids the coverage of the groove 13 by the chip 2.

In S3, the embryo 5 is transferred to the groove 13 of the vessel 1, and the groove 13 is filled with the solution 6. The solution 6 should outstretch the vessel 1 by the surface tension of liquid, forming a hemi-sphere droplet.

In S4, the chip 2 is moved along the direction of vessel 1 (or vice versa) moving the chambers 22 towards the groove 13. This movement enables the three different chemical gels 23 loaded in the chip 2 to sequentially slide across the groove 13. When the gels 23 in the chip 2 contact the solution 6, whose liquid level is higher than the groove 13, mixing between the solution in the gel 23 and the solution 6 in the groove 13 occurs. Where there is a concentration difference, solution exchange occurs, leading the chemicals such as the cryoprotectant in gels 23 to gradually diffuse into the groove 13 and finally enter into the embryo 5. After each of the chambers 22 in the chip 2 has moved across the groove 13, then the chemical delivery into the solution 6 in the groove 13 is complete.

In an embodiment, the coverage area of the gels 23 is at least the same or larger than the opening area of the groove 13, keeping the groove 13 always below the coverage of the gels 23. When the hydrogels 23 cover the groove 13 completely, the solutions exchange is done by diffusion between solutions in the hydrogels 23 and the groove 13. Such a configuration achieves the largest contact area between the hydrogels 23 and the solution 6 in the groove 13 to obtain the highest solution exchange efficiency and reduces the risk of the loss of embryo 5 in the groove 13 during the mixing process between the solution of the gel 23 and the solution 6 in the groove 13. For example, the risk of embryo loss due to excessive liquid flow is reduced, improving the protection of the embryos 5. Additionally, the chip 2 could be controlled to move or stop at any time if needed, which keeps the effective concentration difference between the solution of gel and the groove 13, improving the delivery speed and efficiency.

As shown in FIG. 3, in an embodiment, the chambers 22 that located in two sides of the chip 2, have an opening structure and reduce the width of partition plates between chambers. In other words, the chip 2 may have an open front and back end (e.g., no partition plate 21 is adjacent the front or back of the chip 2). For example, a first gel 23A may be adjacent the front of the chip 2, and a second gel 23B may be adjacent the back of the chip 2. So, when the chip 2 moves distally or vertically along a longitudinal axis of the vessel 1, the groove 13 firstly contacts the first gel 23 before the first partition plate 21. A relatively small width of the partition plates 21 reduces the contact time and area between the partition plates 21 and the solution 6 in the groove 13. Reducing the time that the partition plates 21 and the solution 6 in the groove 13 are in contact may reduce the risk of the embryo 5 being unintentionally removed from the groove 13.

Figure 5A:
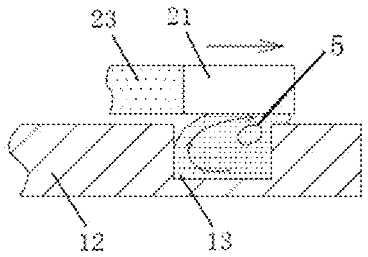
FIG. 5A is a schematic diagram of a chemical delivery system according to one embodiment showing the partition plate in the chip in contact with the solution in the groove during the movement of the chip along the longitudinal axis of the vessel.

As shown in FIG. 5A, in an embodiment where a partition plate 21 contacts the solution 6 in the groove 13 before a gel 23, when the partition plates 21 are positioned on and in contact with the thin film 12, there may be slits or small areas of space between the chip 2 and the thin film 12 because the contact between the partition plates 21 and the thin film 12 is not seamless. When the gel 23 contacts the solution 6 in the groove 13, the slits between the partition plates 21 and the thin film 12 may exert a capillary force to the solution 6 in the groove 13, and, as a result, the slits may be filled by the solution 6 in the groove 13. Therefore, when the gel 23 and solution 6 in the groove 13 diffuse and exchange between each other, the solution 6 in the groove 13 would also flow into the slits between the partition plates 21 and the thin film 12, leading to the risk of carrying the embryos 5 out of the groove 13. Such a configuration likely still presents less risk of losing the embryo 5 compared to using a micropipette.

Figure 5B:
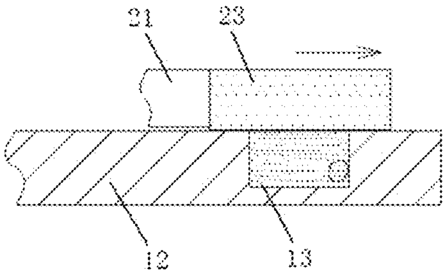
FIG. 5B is a schematic diagram of the chemical delivery system of FIG. 5A showing the gel in the chip in contact with the solution in the groove during the movement of the chip along the longitudinal axis of the vessel.

In another embodiment, as shown in FIG. 5B, a gel 23 contacts the solution 6 in the groove 13 before a partition plate 21. Because the gel 23 has a thin film of solution on the surface of gel 23, when the gel 23 contacts the thin film, the solution on the surface of the gel 23 has close contact with the surface of the thin film 12, eliminating the slits between the gel 23 and the thin film 12. As the close contact is kept between the gel 23 and the thin film 12, when the gel 23 contacts the groove 13 again, the solution 6 in the groove 13 may not be moved by capillary force. Therefore, the diffusion and chemical exchange is stable while also improving the protection of the embryo 5 in the groove 13.

Figure 6:
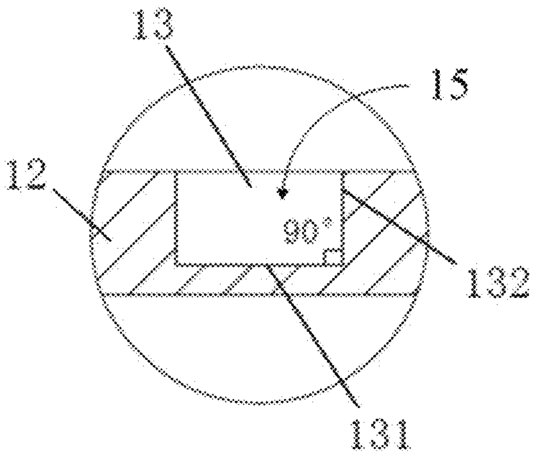
FIG. 6 is a schematic diagram of a cross-section of the vessel of FIG. 2.

In an embodiment, with reference to FIG. 6, the angle between a bottom 131 of the groove 13 and a wall 132 of the groove 13 is about 90°. The bottom 131 and the wall 132 are configured to form an exposed surface (15) with a first surface area 151 of the groove 13. In this way, the risk of the embryo 5 being pulled out of the groove 13 due to the liquid flow of the solution 6 in the groove 13 is reduced, and the position of the embryo 5 in the groove 13 can be better controlled. In another embodiment, the angle between the bottom 131 and the wall 132 of the groove 13 may be an acute angle of less than 90° to further reduce the risk of the embryo 5 being pulled out of the groove 13.

Additionally or alternatively, in some embodiments, the vessel 1 and the chip 2 are configured to move relative to each other in a way other than along the longitudinal axis of the vessel 1. For example, the chip 2 can move both horizontally (side-to-side) and vertically (distally or proximally) along the vessel 1. In an embodiment, the chip 2 may be positioned such that a chamber 22 is horizontally aligned with the groove 13 and is moved sideways until the gel 23 is positioned over the groove 13. This side-to-side movement enables the chambers 22 to come into contact with and be removed from the solution 6 in the groove 13 without requiring the partition plates 21 of the chip 2 to contact the solution 6, which may further reduce the risk of the embryo 5 being accidentally pulled out of the groove 13. The vessel 1 could be quickly and conveniently transferred to cryopreservation equipment, improving the convenience of vessel transfer.

Figure 7:
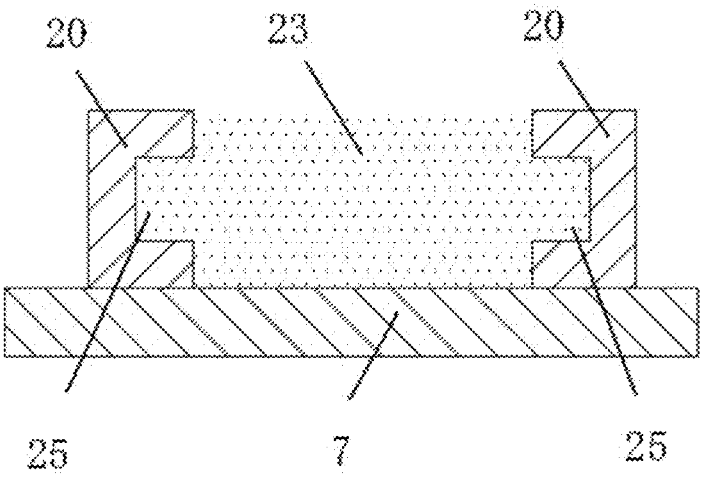
FIG. 7 is a schematic diagram of a cross-section of the chemical delivery system of FIG. 1.

In an embodiment, the chip 2 may be used in the preparation of the chemicals for delivery. For example, the gels 23 may be directly prepared in the chambers 22 of the chip 2. The gels 23 are directly integrated with the chip 2 upon the gel formation, improving the efficiency. Firstly, in an example method of preparing the gels 23, the chip 2 is placed horizontally on a surface 7, such as a bench. The bench 7 acts as a temporary bottom surface of the chip 2 and thus of the chambers 22. The relevant chemical solutions or materials are sequentially placed into the chambers 22. Then the different chemicals can be formed into gels 23 while simultaneously being integrated with or fixed to the chip 2. Referring to FIG. 7, in an embodiment, in order to improve the fixation between the gels 23 and the chip 2, the inner surface of the chip 2 may include a fixing groove 25. For example, the inner surfaces of one or more of the support plates 20 or the partition plates 21 may include a fixing groove 25. Although not shown, the chip 2 may include an auxiliary structure configured to fix the gel 23 into the chip 2 firmly. For example, on the bottom inner surface of the chambers 22, a set of supporting platforms extruded from the bottom inner surface can be used to provide direct support for the gels 23 in the chambers 22. When the gels 23 are formed in situ, the gels 23 extend into the fixing groove 25, thereby forming a mosaic fixation and improving the attachment to the chip 2. Preparing the gels 23 directly in the chambers 22 avoids manual fixation of the gels 23 to the chambers 22 and avoids damage to the gel surface in the fixing process, improving the protection towards the gels 23 and the quality and the performance of the chemical delivery system.

In an embodiment where at least one support plate 20 includes a fixing groove 25, the fixing groove 25 can also serve as a path for installing the partition plates 21. By inserting an end of the partition plates 21 into the fixing groove 25, a detachable connection between the partition plate(s) 21 and the support plate(s) 20 can be formed. The position of the partition plate(s) 21 can also be flexibly adjusted along the fixing groove(s) 25, thereby changing the dimensions of the chambers 22, further improving the flexibility of the chip 2. Similarly, in other embodiments, other forms of movable connection can also be adopted between the partition plates 21 and the support plates 20. For example, several slots can be mounted on the support plates 20 to allow the insertion of several partition plates 21.

Through inserting the partition plates 21 into different slots, the dimension of the chambers 22 can be adjusted.

In some embodiments, the chip 2 may include a label 26. The label 26 may include, for example, a description of the chemicals in each chamber 22. A label 26 may improve the convenience and ease of using the device and help the operators.

Additionally, in some embodiments, the different solutions (e.g., basic solution, equilibration solution, and vitrification solution) may also be immobilized on or contained by the chip 2 in other ways and subsequently achieve diffusion and exchange between the solution 6 and the groove 13. For example, a permeable substrate, such as a membrane (e.g., dialysis membrane), mesh, or film, of suitable thickness and pore size can be placed on the lower surface of the chip 2 and act as a bottom surface of the chambers 22. The solutions to be delivered can be directly added into the respective chambers 22 with the support by the permeable substrate. The thickness and pore size of the permeable substrate may vary based on, for example, the solution or chemicals to be delivered and the time constraints. The coverage of the groove 13 by the permeable membrane, mesh, or dialysis membrane may prevent overflow of the embryo 5, and further diffusion and exchange between the two solutions could be achieved. In an embodiment where the chip 2 includes a permeable substrate, the chemicals to be delivered by be in a powder or solid form.

Figure 8:
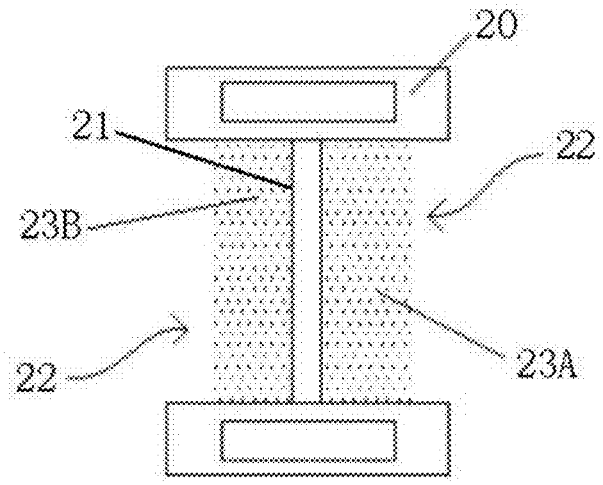
FIG. 8 is a schematic diagram showing the structure of the chip of a chemical delivery system according to one embodiment.
Figure 9:
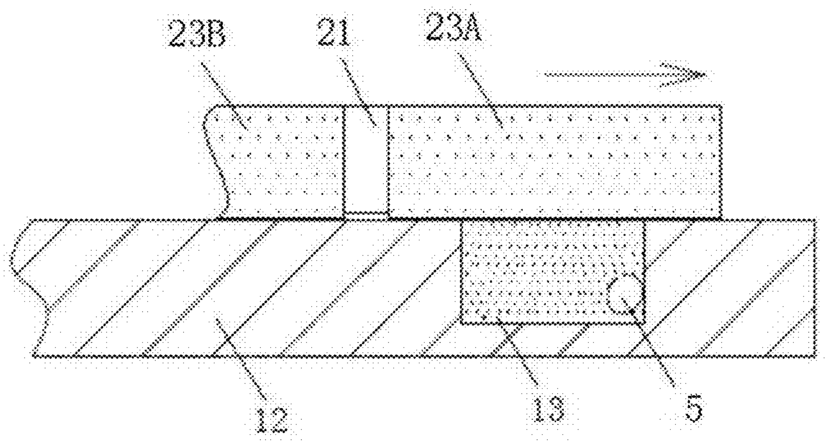
FIG. 9 is a schematic diagram showing the movement of the partition plate in the chip in contact with the solution in the groove during the movement of the chip along the longitudinal axis of the vessel according to one embodiment.

With reference to FIGS. 8 and 9, in an embodiment, the chip 2 may include one partition plate 21 and two chambers 22 for fixing the equilibrium solution hydrogel 23A and vitrification solution hydrogel 23B. In an embodiment, the basic solution and the embryo(s) 5 are pre-loaded into the groove 13. As described above, the bottom surface of a gel 23 may be flush with the bottom of the frame structure or may extend beyond the bottom surface of the chamber 22. As a result, when the hydrogels 23A, 23B move across the groove 13 along the vessel 1, it can ensure that each of the hydrogels 23A, 23B effectively contacts the solution 6 in the groove 13, further ensuring the effective delivery of solutions. The relative movement between the vessel 1 and chip 2 is described above.

As described above, it is possible that slits between the partition plate 21 and the vessel 1 would exert a capillary force on the solution 6 in the groove 13. Referring again to FIG. 9, because the hydrogels 23 have a thin film of solution on the surface, when the hydrogels 23 contact the vessel 1, the solution on the surface of the hydrogels 23 can be in close contact with the surface of the vessel 1, which may help eliminate the slits between the hydrogels 23 and the vessel 1. This reduces the risk that the embryo 5 would flow with the solution out of the groove 13 into the slits between the partition plate and the vessel under capillary force. Therefore, in the process of solution exchange between hydrogel 23 and the solution 6 in the groove 13, the embryo 5 could stay safely in the groove 13, improving the protection of the embryos 5.

Referring to FIG. 10, a method of using a chemical delivery system (e.g., the system of FIGS. 8 and 9) according to an embodiment to process different solutions in, for example, the embryo vitrification process is provided. The order of these steps may vary. First, separate hydrogels 23A, 23B may be prepared for the equilibrium solution and the vitrification solution, respectively S11. An example method of preparation is described below. Next, in Step S12, the embryo 5 is pre-loaded with the basic solution into the groove 13 of the vessel 1. Then, in Step S13, the hydrogels 23A, 23B with the equilibrium solution and the vitrification solution are placed on the vessel 1 e.g., via the chip 2. The hydrogels 23A, 23B are sequentially moved into contact with the groove 13, which contains the basic solution and the embryo 5. In an embodiment where a frame structure supports and fixes the hydrogels 23A, 23B in place, the hydrogels 23A, 23B could be handled by the frame structure in Step S13, which could not only be convenient to precisely move and manipulate the hydrogels 23A, 23B, but also reduce the direct contact with the hydrogels 23A, 23B to avoid contamination and damage to the hydrogels 23A, 23B and improve the protection of the hydrogels 23A, 23B. When each hydrogel 23A, 23B contacts the solution in the groove 13, which is originally the basic solution, diffusion occurs between the solutions in the hydrogel 23A, 23B and the solution in the groove 13. In this way, the embryo 5 can stay within the groove 13 throughout the whole process of the sequential chemical delivery, or even for the following cryopreservation process, without any additional transfer. Such a technique could avoid the inconvenience for operators to repeatedly transfer the embryos.

In some embodiments, the time that each hydrogel 23A, 23B is in contact with the solution in the groove 13 may be adjusted. For example, the moving speed of the hydrogels 23A, 23B may be adjusted to control the time that each hydrogel 23A, 23B is in contact with the solution in the groove 13. Adjusting the moving speed of the hydrogels 23A, 23B along the surface of the vessel 1 in Step S13 allows for precise control of the contact time of the equilibrium solution hydrogels and vitrification solution hydrogels with the solutions in the groove, respectively. In an embodiment, the frame structure could move at a uniform speed along the surface of vessel 1, but the dimensions of the hydrogels 23A, 23B may be varied to precisely control the contact time of the equilibrium solution hydrogel 23A and vitrification solution hydrogel 23B with the solution in the groove 13, respectively.

Now referring to FIGS. 11 and 12, in an example embodiment, the chemical delivery system for the embryo cryopreservation includes the vessel 1, the chip 2, and a substrate 3. The substrate 3 may include a channel in which the central region is used for supporting and fixing the vessel 1. The substrate 3 may be made of, for example, steel. Two paths 31 are used to support, adhere, and fix the frame structure of the chip 2. By adjusting the height of the paths 31, the corresponding position between the chip 2 and the upper surface of the vessel 1 can be adjusted, ensuring the effective contact between the gels 23 and the solution 6 in the groove 13.

Similarly, in some embodiments, a rail guide can be set on each path 31 to provide guide for the chip movement when the chip 2 is placed between the two rail guides, improving the directional accuracy of the chip movement on the substrate 3.

Still referring to FIGS. 11 and 12, in an embodiment, a detachable connection is formed between the paths 31 and the chip 2 by, for example, a magnetic force. For example, the paths 31 may be made of ferromagnetic metal. A magnet 24 (as shown in FIG. 3) is provided at a corresponding location on the frame structure e.g., on support plate 20 of the chip 2 to magnetically couple the chip 2 and the paths 31. In an embodiment, the connection between the paths 31 and the chip 2 can also be electromagnetic, so that the substrate 3 and the chip 2 can quickly connect or detach by controlling the electricity, which further improves the convenience.

In an embodiment, the substrate 3 not only can support vessel 1, but further hold the vessel 1 by adhesion or buckling. The substrate 3 can ensure the stability of the position of the vessel 1 during the process, plus supporting the chip 2. The substrate 3 can keep the vessel 1 and the chip 2 in contact effectively, avoiding any accidental detachment during the movement of the chip 2 along the vessel 1 that would affect the operation. Besides, the substrate 3 can also collect the overflow solution from the groove 13 to avoid contamination to the surrounding environment.

As shown in FIG. 12, in an embodiment, the substrate 3 includes a light-transparent region 32, which may be located at the central area of the substrate 3. At least a portion of the groove 13 is also formed by a light-transparent material. When the light-transparent portion of the groove 13 is positioned over the light-transparent region 32 of the substrate 3, a microscope can be used for real-time observation to ensure precise chemical delivery.

Furthermore, in an embodiment, based on the practical operation requirements, besides using common light-transparent materials to satisfy only the requirement of transparency, the light-transparent regions can also be made of transparent materials with heating functionality, such as heating glass, to further allow both transparency and temperature control simultaneously.

In addition, although only one vessel 1 and one chip 2 are disposed on the substrate 3 shown in FIGS. 11 and 12, depending on the number of embryos 5 to be processed and the dimension of the chambers 22 in the chip 2 (i.e., the coverage width of the gels 23), multiple vessels 1 can be arranged on the substrate 3 to allow simultaneous chemical delivery to several vessels 1 in a single movement of the chip 2, thereby improving the efficiency.

Figure 13:
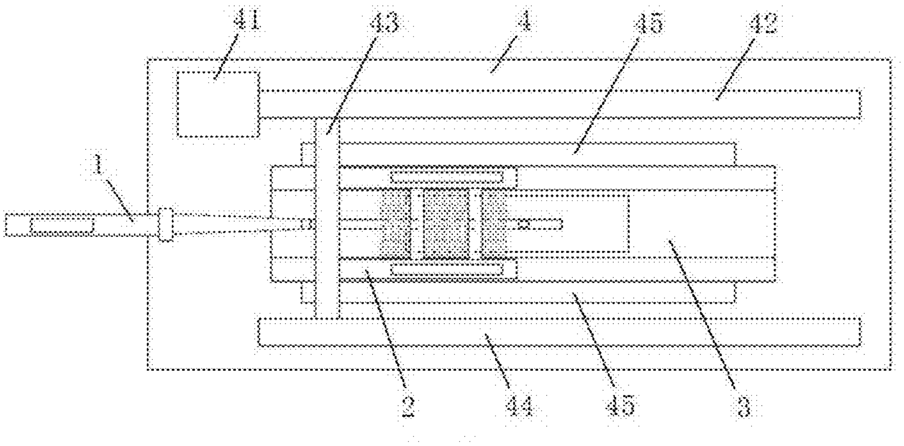
FIG. 13 is a schematic diagram of the structure of the chemical delivery system according to one embodiment.

With reference now to FIG. 13, in an embodiment, besides the vessel 1, the chip 2 and a substrate 3, the chemical delivery system for the chemical delivery system for the embryo cryopreservation also includes a base 4 for the direct support to the substrate 3. A stepping motor 41, screw rod 42, and a pushing rod 43 are mounted on the base 4. Therein, the substrate 3 is located on the base 4 and is generally parallel to the screw rod 42. The pushing rod 43 is mounted on the screw rod 42 and connected to the chip 2. The pushing rod 43 is configured to move forward and backward under the driving of the stepping motor 41. In other words, the stepping motor 41 drives the pushing rod 43 to move back and forth horizontally along the screw rod 42, so that the chip 2 moves horizontally with respect to the vessel 1. This movement of the chip thereby controls the sequential contact between the gels 23 in different chambers 22 in the chip 2 and the solution 6 in the groove 13, achieving automatic control of the delivery process. Further, by controlling the stepping motor 41, the different contact times between the different gels 23 in the chip 2 and the solution 6 in the groove 13 can be precisely controlled, improving the accuracy of the delivering different solutions to the embryo 5.

As shown in FIG. 13, a plain shaft 44 is also provided on the base 4 in an embodiment. The plain shaft 44 is parallel to the screw rod 42 and is connected to the free end of the pushing rod 43, to provide an auxiliary guide for the back and forth movement of the pushing rod 43. It can improve the stability of the pushing rod 43 to drive the chip 2 to move and the stability of the gels 23 in contact with the solution 6 in the groove 13.

In an embodiment, as shown in FIG. 13, a hollow region 45 is located at the central area of the base 4. This hollow region 45 corresponds to the light-transparent region 32 in the substrate 3. In this way, the light can be projected smoothly through the base 4 to the light-transparent regions in the chip 2, which allows the observation of the embryo 5 under the microscope. Meanwhile, based on the different practical application conditions, the hollow region 45 can be made of light-transparent materials, such as light-transparent glass, and may also be made of transparent materials with heating functionality, such as heating glass, to simultaneously allow both transparency and temperature control.

Figure 14:
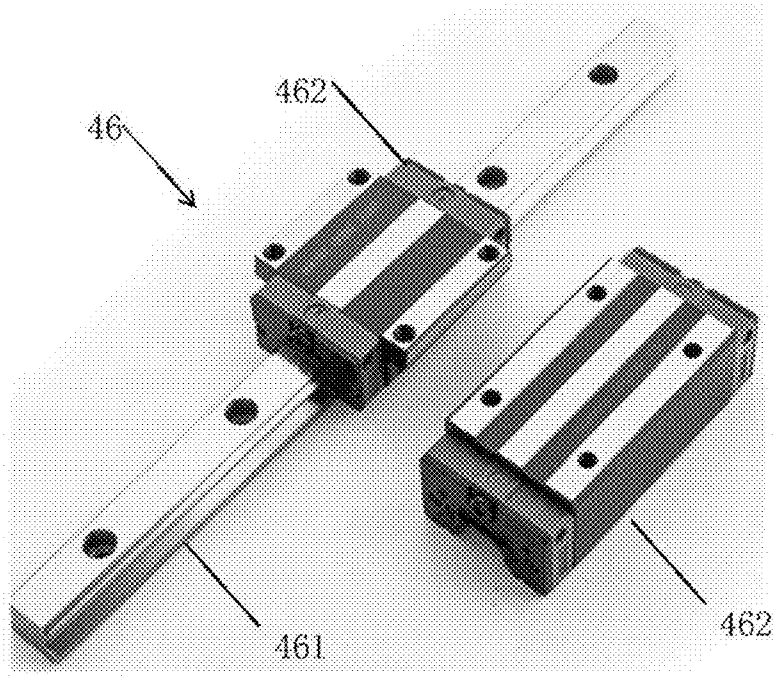
FIG. 14 is a schematic depiction of a track slider structure of the chemical delivery system according to one embodiment.

In addition, in other embodiments, the structure providing the relative movement between the vessel 1 and the chip 2 may vary. For example, referring to FIG. 14, a track slider structure 46 can be used to form a driving unit to drive the corresponding movement of the chip 2 to vessel 1. The track slider structure 46 may include a track 461 and a slide support 462 that is slidable along the track 461. The slide support 462 may be, for example, coupled to the vessel 1 or the chip 2. The track slider structure 46 may allow relative movement between the vessel 1 and the chip 2 due to the back and forth movement of the slide support 462 along the track 461. The size and shape of the slider support 462 may vary as shown in FIG. 14.

Figure 15:
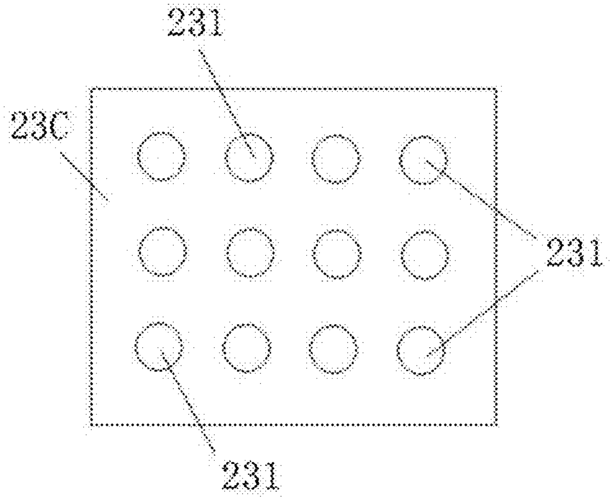
FIG. 15 is a schematic diagram of the structure of a hydrogel according to one embodiment.

In various embodiments, a biomaterial may be sequentially loaded into different hydrogels to achieve sequential chemical delivery to the biomaterial. With reference to FIG. 15, in an embodiment, a hydrogel 23C provides several receptacles 231 for loading an embryo 5 or another biomaterial. The embryo 5 may be loaded with an initial solution into the receptacles 231. After loading the embryo 5 into the receptacles 231, the solution in the hydrogel 23C will firstly diffuse into the solution surrounding the embryo 5 and then diffuse into the embryo 5 itself. During this process, the embryos 5 would not move inside the immobile hydrogel 23C but would stay in the receptacle 231 for the desired period of time. After a predetermined period of time, the embryos 5 may be transferred to receptacles 231 in another hydrogel 23C containing a different solution. Thus, a series of hydrogels may be used to sequentially deliver different chemicals to the embryo 5. The problem in the conventional method that the embryo would flow away and leave the focal plane when loading the embryo into the solutions would be solved. With the help of a light microscope, the operator could manipulate the embryos 5 more quickly and precisely, and as a result, the contact between the embryo 5 and different solutions would be quicker and more precise.

The shape of the hydrogels 23C may vary. For example, the shape may be plate-like with cylindrical openings (e.g., as shown in FIG. 15). In another embodiment, the hydrogels may include one or more grooves configured to receive the embryo 5. Depending on different requirements, hydrogels 23C could be loaded into a flat plate with multiple mounting holes, to satisfy the requirement of transfer and manipulation of embryos 5 among different hydrogels 23C.

Figure 16:
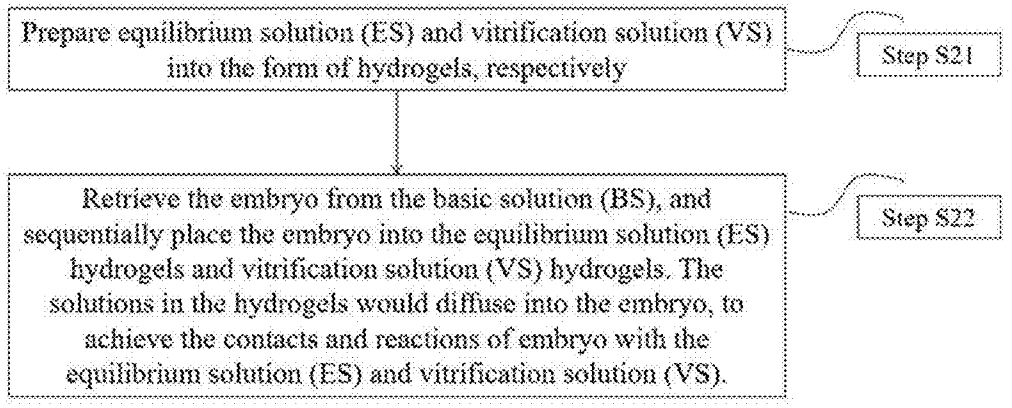
FIG. 16 is a flow chart of sequential chemical delivery in embryo vitrification procedures according to one embodiment.

With reference to FIG. 16, a method of using a chemical delivery system according to an embodiment to process different solutions in, for example, the embryo vitrification process is provided. In Step S21, one or more hydrogels 23C may be prepared using the equilibrium solution and, separately, the vitrification solution. An example method of preparation is described below. In an embodiment, the embryo 5 is pre-loaded into the basic solution, and the equilibrium solution and vitrification solution are sequentially delivered to the embryo 5 via the hydrogels 23C. Next, in Step S22, the embryo is retrieved from the basic solution and sequentially placed into the equilibrium solution hydrogel and then the vitrification solution hydrogel. The solutions in the hydrogels 23C would diffuse into the embryo 5 to achieve the desired reactions of the embryo 5 with the equilibrium solution and vitrification solution.

Figure 17:
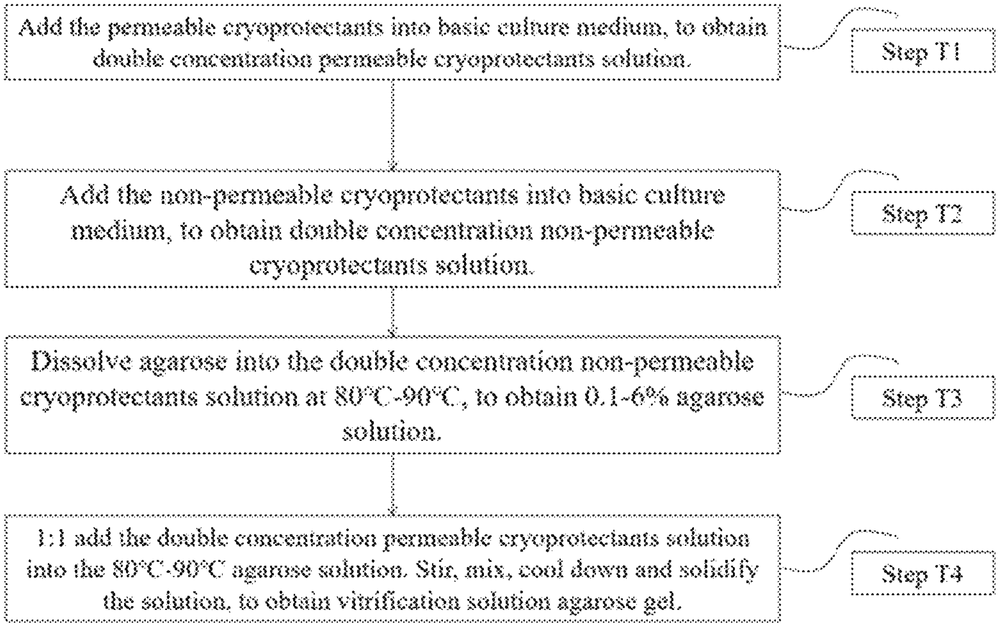
FIG. 17 is a flow chart of the preparation of a hydrogel according to one embodiment.

As discussed above, embodiments described herein include a method of preparing hydrogels for chemical delivery to biomaterials. With reference to FIG. 17, a method of preparing hydrogels according to an embodiment to be used in, for example, the embryo vitrification process is provided. The solutions for cryopreservation mainly include three components: permeable cryoprotectants, non-permeable cryoprotectants, and basic culture medium. An example procedure for preparing a vitrification solution into agarose gel of a physical hydrogel includes the following steps. First, the permeable cryoprotectants are added into basic culture medium, to obtain a double concentration permeable cryoprotectants solution, the solution having a permeable cryoprotectant concentration of 10-50 vol % (Step T1). Next, the non-permeable cryoprotectants are added into basic culture medium, to obtain a double concentration non-permeable cryoprotectants solution, the solution having a non-permeable cryoprotectant concentration of 0.2-2 M (Step T2). In Step T3, agarose is dissolved into the double concentration non-permeable cryoprotectants solution at 80° C.-90° C., to obtain an agarose solution having a concentration of 0.1-6% of agarose. Then, the double concentration permeable cryoprotectants solution is added into the 80° C.-90° C. agarose solution in a 1:1 ratio Step T4. The mixture is stirred and allowed to cool down and solidify. The solidified solution is an agarose gel including the vitrification solution.

Similarly, in another embodiment, depending on specific requirements for different working conditions, equilibrium solution and vitrification solution could also be prepared into other forms of physical hydrogels, such as sodium alginate hydrogel or gelatin hydrogel. Additionally, chemically crosslinked hydrogels could also be adopted, such as the use of GelMA hydrogel.

In an embodiment, a single hydrogel of the vitrification solution is prepared to achieve the delivery of the entire amount of the vitrification solution to embryo at once. In another embodiment, depending on different conditions, for example, the concentration of vitrification solution, multiple hydrogels of the vitrification solution could be prepared, which could be sequentially delivered to the embryo to achieve the whole delivery of vitrification solution. The concentration of the vitrification solution in the multiple hydrogels may vary. While the embodiments described above are discussed in relation to a vitrification solution, the embodiments are not so limited—other chemicals or solutions may be used. For example, to make a hydrogel for an equilibrium solution, the permeable cryoprotectant concentration will be lower than that of vitrification solution and may optionally include a non-permeable cryoprotectant or may not include non-permeable cryoprotectant. Generally, an equilibrium solution has a lower concentration of permeable cryoprotectant (e.g., half of the concentration) than a vitrification solution.

As described above, embodiments described herein also include a cryopreservation process including preserving a biomaterial using a hydrogel comprising a cryoprotectant. The cryopreservation process may include contacting the biomaterial with the hydrogel to allow the biomaterial to react with the cryoprotectant.

In addition, although the descriptions of the example embodiments mentioned above describe chemical delivery in the embryo cryopreservation process, embodiments of this technology can be also applied in delivering chemicals or solutions to other biomaterials or basic solutions, especially for the operators in this technical field. For example, an embodiment can be used to deliver powdered chemicals initially separated by a water-soluble film to a solution. When a chip slides over the membrane, the solution in the groove dissolves the membrane and the membrane breaks, allowing the chemicals directly release to the solution quantitatively, thus, achieving the precise chemical delivery to the solution.

In various embodiments disclosed herein, a single component can be replaced by multiple components and multiple components can be replaced by a single component to perform a given function or functions. Except where such substitution would not be operative, such substitution is within the intended scope of the embodiments.

Some of the figures can include a flow diagram. Although such figures can include a particular logic flow, it can be appreciated that the logic flow merely provides an exemplary implementation of the general functionality. Further, the logic flow does not necessarily have to be executed in the order presented unless otherwise indicated. In addition, the logic flow can be implemented by a hardware element, a software element executed by a computer, a firmware element embedded in hardware, or any combination thereof.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

What is claimed is:

1. A method of using hydrogels for chemical delivery to biomaterials comprising:
- preparing chemicals to be delivered into the form of the hydrogels;
- pre-loading the biomaterials into a groove of a vessel that is filled with a solution;
- sequentially contacting the hydrogels with the biomaterials by either moving the hydrogels into contact with the vessel or moving the vessel into contact with the hydrogels to diffuse the chemicals in the hydrogels into the biomaterials to achieve chemical delivery; and
- providing a frame structure comprising support plates and chambers for the fixation of hydrogels, wherein the hydrogels are fixed into the chambers.

2. The method of claim 1, wherein a coverage area of the chambers is the same or larger than an opening area of the groove in the vessel.

3. The method of claim 1, wherein a bottom surface of the hydrogels is flush with or extended out of an opening of the chambers.

4. The method of claim 1, wherein sequentially contacting the hydrogels includes moving the support plates vertically along a surface of the vessel wherein the hydrogels vertically and directly contact the solution in the groove.

5. The method of claim 1, wherein sequentially contacting the hydrogels includes moving the support plates horizontally along a surface of the vessel wherein the hydrogels horizontally and gradually contact the solution in the groove.

6. The method of claim 5, wherein the support plates move relative to the surface of the vessel, wherein the chambers adapt opening structures at front and back ends thereof.

7. The method of claim 5, wherein preparing chemicals to be delivered into the form of hydrogels includes simultaneously fixing the hydrogels into the chambers.

8. The method of claim 7, wherein the chambers are aligned in the frame structure to sequentially move across the groove on the vessel.

9. The method of claim 8, wherein a dimension of the chambers is uniform, the method further comprising adjusting a moving speed of the support plates relative to the vessel to control a contact time between the hydrogels in each of the chambers and the solution in the groove.

10. The method of claim 8, wherein sequentially contacting the hydrogels includes moving the support plates along the vessel at a uniform speed, the method further comprising adjusting the dimension of each of the chambers to control a contact time between the hydrogels in each of the chambers and the solution in the groove.

11. The method of claim 1, wherein the hydrogels are fixed, and sequentially contacting the hydrogels with a biomaterial the biomaterials comprises sequentially transferring the biomaterials into each of the hydrogels.

12. The method of claim 11, wherein the hydrogels include receptacles for loading the biomaterials.

13. The method of claim 1, wherein the hydrogels are physical hydrogels or chemical hydrogels.

14. The method of claim 13, wherein preparing chemicals to be delivered into the form of hydrogels includes preparing a vitrification solution into an agarose gel, comprising:

adding permeable cryoprotectants into basic culture medium to obtain a permeable cryoprotectants solution;

adding non-permeable cryoprotectants into basic culture medium to obtain a non-permeable cryoprotectants solution;

dissolving agarose into the non-permeable cryoprotectants solution at 80° C.-90° C., to obtain an agarose solution having a concentration in a range of 0.1-6%; and adding the permeable cryoprotectants solution into the agarose solution in a 1:1 ratio to form a mixture; and allowing the mixture to solidify.

15. The method of claim 1, wherein the chemicals are cryoprotectants, and wherein sequentially contacting the hydrogels with a biomaterial comprises sequentially contacting the hydrogels with one or more oocyte or embryo to diffuse the cryoprotectant in the hydrogels into the one or more oocyte or embryo to deliver the cryoprotectants to the one or more oocyte or embryo.

* * * * *